United States Patent [19]

Belt

[11] Patent Number: 4,518,189

[45] Date of Patent: May 21, 1985

[54] COOKING APPARATUS FOR PICKUP TRUCKS

[76] Inventor: Robert Belt, 25611 Walnut Grove, Spring, Tex. 77380

[21] Appl. No.: 458,837

[22] Filed: Jan. 18, 1983

[51] Int. Cl.³ ............................................. B60R 7/08
[52] U.S. Cl. .................................... 296/22; 296/37.1; 296/156; 126/24; 126/56; 248/416
[58] Field of Search ................. 296/156, 22, 24 A, 50, 296/37.1, 37.5, 37.6; 126/24, 29, 56, 19 M, 19.5, 25, 30, 25 AA; 248/503, 510, 285, 416, 124

[56] References Cited

U.S. PATENT DOCUMENTS

| | | | |
|---|---|---|---|
| 2,543,221 | 2/1951 | Barany | 248/285 |
| 2,940,439 | 6/1960 | Bertels et al. | 126/30 |
| 3,032,783 | 5/1962 | Swanson, Jr. | 126/24 X |
| 3,048,360 | 8/1962 | Foley | 248/285 X |
| 3,094,113 | 6/1963 | Avila | 126/9 |
| 3,127,888 | 4/1964 | Burnham, Jr. et al. | 248/124 |
| 3,406,999 | 10/1968 | Kozicki | 296/156 |
| 3,692,351 | 9/1972 | Christopher et al. | 296/156 |
| 4,089,554 | 5/1978 | Myers | 296/24 A |

Primary Examiner—Robert B. Reeves
Assistant Examiner—Russell D. Stormer
Attorney, Agent, or Firm—Neal J. Mosely

[57] ABSTRACT

A cooking apparatus has a pivotal mounting unit attached to the bed of a pickup truck for supporting a cooking unit thereon. The pivotal mounting unit comprises a vertically extending pivotal support member which supports a pair of horizontally extending parallel rods or tubes which extend into and support a cooking unit slidably mounted thereon. The rods or tubes extend nearly the entire length of the cooking unit and support the cooking unit in a variety of positions.

8 Claims, 8 Drawing Figures

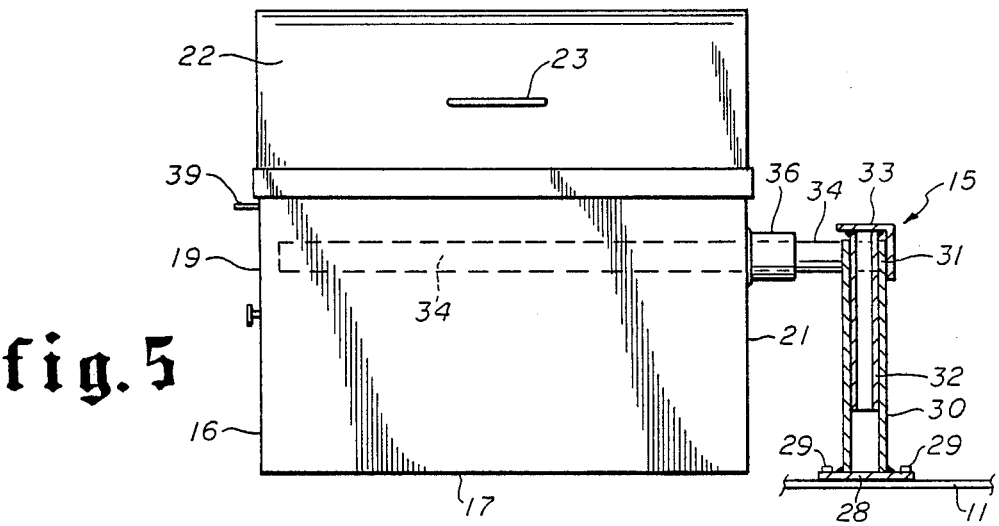
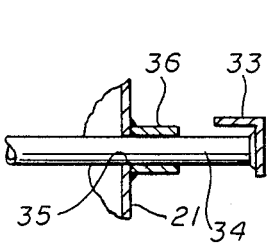
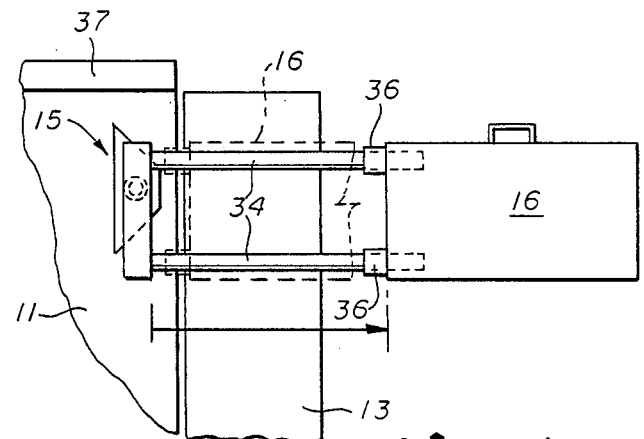
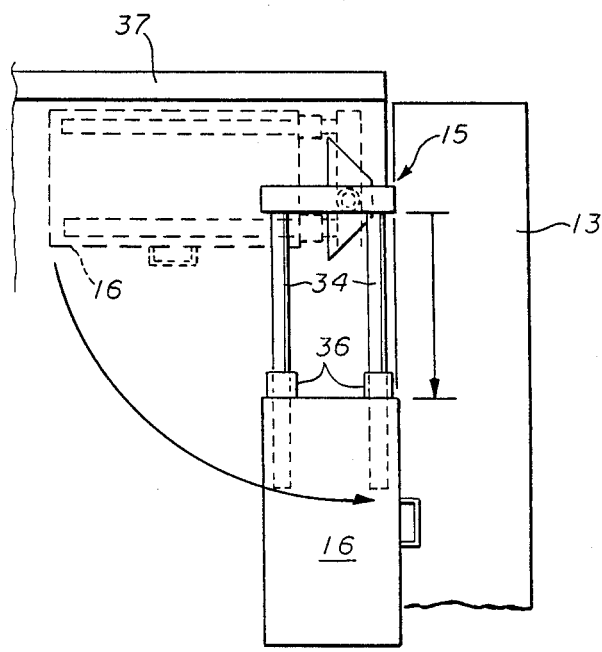

COOKING APPARATUS FOR PICKUP TRUCKS

BACKGROUND OF THE INVENTION

1. Field of the Invention

This invention relates to the field of cooking apparatus, and more particularly to a novel construction having a pivotal mounting unit attached to the bed of a pickup truck for supporting and facilitating pivotal and lateral movement of the cooking unit.

2. Brief Description of the Prior Art

Holders and supports for cooking apparatus are known in the prior art, and some are particularly adapted for mounting the cooking apparatus to recreational vehicles.

Burnham, U.S. Pat. No. 3,127,888 discloses a charcoal grill holder that is insertable into the flag socket of a boat and which allows the grill to be suspended over the water.

Christopher, U.S. Pat. No. 3,692,351 discloses a cooking apparatus having a mounting for securing the same to the side of a motorhome. The cooking unit slides out of the side of the vehicle on the mounting which is similar to a drawer slide in operation. No pivotal movement of the cooking unit is provided.

Kozicki, U.S. Pat. No. 3,406,999 discloses a galley which is stored in the floor well of a station wagon and is swingable on linkage means out of the well.

Avila, U.S. Pat. No. 3,094,113 discloses an outdoor cooking unit having a plurality of utensils mounted on a pedestal. The unit is not designed for mounting on a vehicle and the cooking unit does not have lateral movement.

The prior art in general, and none of these patents in particular, disclose the present invention.

SUMMARY OF THE INVENTION

It is therefore one object of the present invention to provide a cooking apparatus mounted in the bed of a pickup truck.

It is another object of this invention to provide a cooking apparatus for truck installation having a pivotal mounting unit for supporting and facilitating pivotal and lateral movement of the cooking unit.

Another object of this invention is to provide a cooking apparatus mounted in the bed of a pickup truck which can be used in a variety of positions.

Other objects of the invention will become apparent from time to time throughout the specification and claims as hereinafter related.

The above noted objects and other objects of the invention are accomplished by a cooking apparatus having a pivotal mounting unit attached to the bed of a pickup truck for supporting a cooking unit slidably mounted thereon and which comprises a vertically extending pivotal support member which supports a pair of horizontally extending parallel rods or tubes which extend into and support the cooking unit. The rods or tubes extend nearly the entire length of the cooking unit and will support the cooking unit in a variety of positions.

BRIEF DESCRIPTION OF THE DRAWINGS

FIG. 5 is a view in front elevation of the present invention taken along lines 5—5 of FIG. 4.

FIG. 6 is a view in cross section of a portion of the present invention taken along lines 6—6 of FIG. 4.

FIG. 7 is a top plan view of the present invention illustrating pivotal and lateral movement of the cooking apparatus.

FIG. 8 is a top plan view of the present invention illustrating further pivotal and lateral movement of the cooking apparatus.

DESCRIPTION OF THE PREFERRED EMBODIMENT

Figure 1:
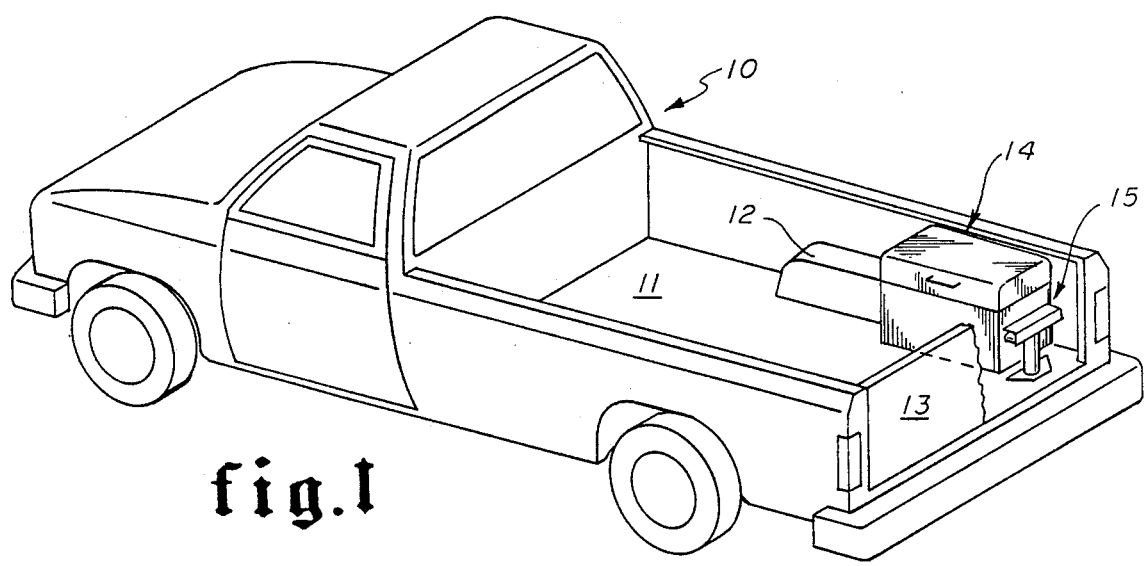
FIG. 1 is an isometric view of the cooking apparatus mounted in the bed of a pickup truck.

Referring to the drawings by numerals of reference, and more particularly to FIG. 1, there is shown a conventional pickup truck 10 having a bed floor 11, wheel well 12, and tailgate 13. A preferred cooking apparatus 14 is shown mounted in truck 10 between wheel well 12 and tailgate 13. Cooking apparatus 14 is supported by means of mounting unit 15 which is attached to truck bed 11.

Figures 2, 3:
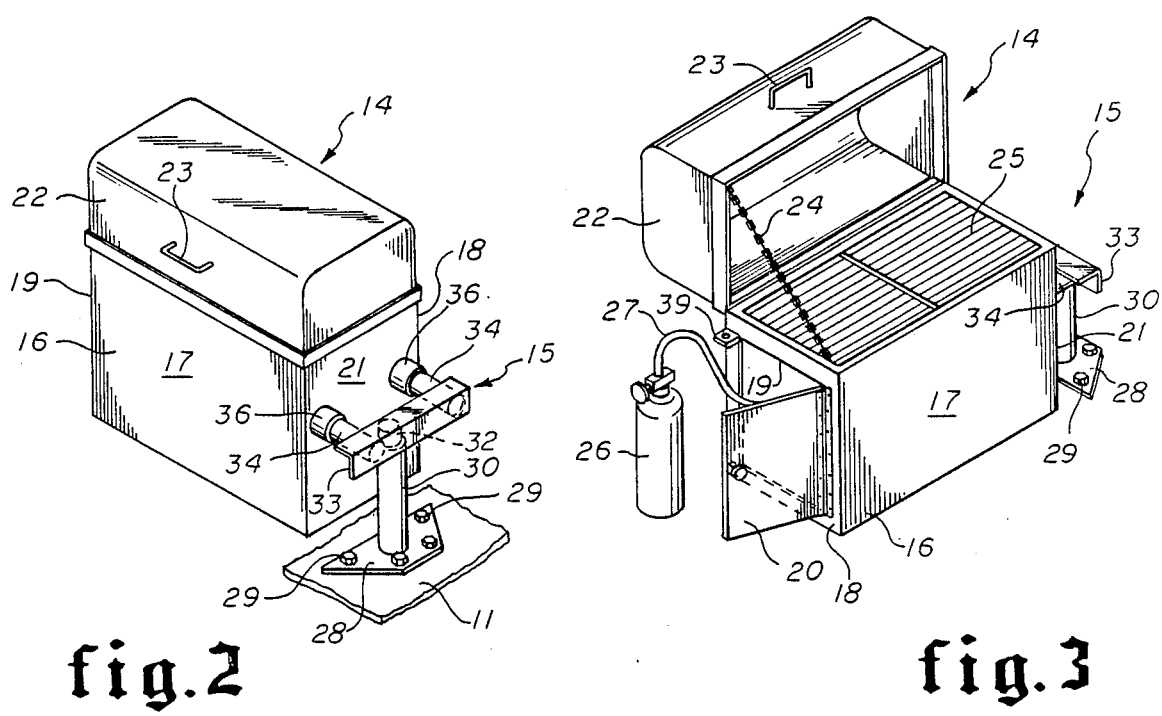
FIG. 2 is an isometric view showing the front and right side of the cooking apparatus for pickup trucks.
FIG. 3 is an isometric view showing the front and left side of the cooking apparatus for pickup trucks.
Figure 4:
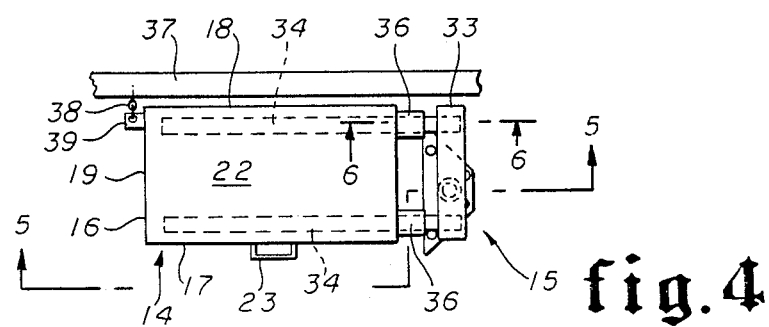
FIG. 4 is a top plan view of the present invention.

Referring now to FIGS. 2, 3, and 4, cooking apparatus 14 comprises a generally rectangular box shaped cooking enclosure 16 having a bottom (not shown), a front wall 17, a back wall 18, left side wall 19 containing a hinged door 20, a right side wall 21, and a hinged lid 22 having a handle 23 and a retaining chain 24.

FIG. 3 shows the cooking enclosure 16 with the lid opened to expose a cooking grill 25. A fuel container 26 having a fuel supply hose 27 is connected to a burner (not shown) inside the enclosure 16. A bottled gas type of cooking arrangement has been shown for purposes of illustration only. Components used inside the enclosure for cooking may be of any conventional type such as charcoal brickettes, wood, gas burners, and the like, and are not the subject of this invention.

Referring now to FIGS. 2 to 6, mounting unit 15 comprises a flat horizontal base flange 28 adapted to receive bolts 29 for bolting the mounting unit 15 to the pickup truck bed 11. A hollow supporting tube 30 is welded to base flange 28 and extends vertically therefrom. The upper end 31 of hollow tube 30 is open and of sufficient inside diameter to receive a smaller pivot tube 32 therein. There is sufficient clearance between the inside diameter of hollow supporting tube 30 and the outside diameter of smaller pivot tube 32 to allow rotary movement therebetween.

Smaller pivot tube 32 extends downwardly inside vertical hollow supporting tube 30 and has its top end welded perpendicular to an angle iron bracket 33. Two parallel tubes 34 are welded to the angle iron bracket 33 and extend horizontally therefrom. The two parallel tubes are oriented perpendicular to the downwardly extending smaller pivot tube 32.

Right side wall 21 of enclosure 16 contains two openings 35 and tubular sleeves 36 welded thereon (FIG. 6). Openings 35 and sleeves 36 have sufficient inside diameters to slidably receive the horizontally extending parallel tubes 34. Parallel tubes 34 extend through the sleeves 36 and openings 35 and into the enclosure 16 and terminate just short of the left side wall 19.

It should be understood by the foregoing description that the cooking enclosure 16 is supported on mounting unit 15 in a manner to provide pivotal and lateral movement. Pivotal movement is provided by the rotary motion between the vertically extending hollow tube 30 and the internal smaller tube 32. Lateral movement is provided by the sliding fit of the sleeves 36 and openings 35 of the enclosure 16 on the horizontal parallel tubes 34.

OPERATION

Referring first to FIG. 4 and then to FIGS. 7 and 8, the pivotal and lateral movement can be clearly explained. FIG. 4 shows the cooking enclosure 16 in a latched position. Truck side wall contains a conventional latch device 38 cooperative with a tab 39 extending from left side wall 19 of enclosure 16.

FIG. 7 shows the cooking enclosure 16 pivoted 90° from the latched position (dotted lines). Truck tailgate 13 is in the down position and may be used as a working surface for preparing foods or for eating. Cooking enclosure 16 may be located near the mounting unit 15, or may slide on the parallel tubes 34 to any convenient location between the truck side walls 37.

FIG. 8 shows the cooking enclosure 16 pivoted 180° from the latched position of FIG. 4. Tailgate 13 is in the down position. Cooking enclosure 16 may extend partially over the tailgate 13, or may slide outwardly from mounting unit 15 on parallel tubes 34 to extend beyond the tailgate 13.

The cooking enclosure 16 may be used in a variety of positions within 180° of turn, as just described. The enclosure 16 may also be completely removed from the mounting unit 15 by sliding the enclosure 16 off the parallel tubes 34, or by lifting the smaller tube 32 out of the vertical hollow tube 30. By removing the enclosure 16 from the mounting unit 15, the cooking enclosure 16 may be cleaned or may be used conventionally in a loction away from the pickup truck 10.

While this invention has been described fully and completely with special emphasis upon a preferred embodiment, it should be understood that within the scope of the appended claims the invention may be practiced otherwise than as specifically described herein.

I claim:

1. The combination with a pickup truck having a bed, of a pivotal mounting unit and a cooking apparatus comprising;
   a base supporting plate secured to said truck bed,
   a vertically extending support member comprising a hollow tubular member having one end attached to said base supporting plate and its other end open and extending vertically therefrom,
   a pivot member comprising a smaller tubular member having one end extending downward into said open end of said support member and the opposing end extending upwardly therefrom, said smaller tubular member removably received within said open end with sufficient clearance to permit rotary motion relative thereto,
   a bracket secured on said upwardly extended end of said smaller tubular member,
   a pair of support members each having one end secured on said bracket in a fixed position and the opposing ends extending horizontally outward therefrom in fixed parallel relation, and
   a box shaped cooking enclosure having one wall provided with openings therethrough slidably receiving said horizontally extending parallel support members for removably supporting said cooking enclosure thereon and movable to and from an extended position supporting said cooking enclosure away from said support bracket.

2. The combination according to claim 1 including
   tubular support members secured in said openings in said cooking enclosure,
   said horizontally extending parallel support members being tubular members slidably positioned in said cooking enclosure tubular support members to support the same for sliding movement thereon.

3. The combination according to claim 2 in which
   said horizontally extending parallel support members extend for substantially the entire length of said cooking enclosure.

4. The combination according to claim 1 wherein
   said cooking enclosure includes a bottom, front and back side walls, end side walls, and a top lid member, and
   said horizontally extending ends of said parallel support members are tubular members slidably positioned in said cooking enclosure tubular support members to support the same for sliding movement thereon.

5. The combination according to claim 1 wherein
   said horizontally extending parallel support members are tubular members slidably positioned in said cooking enclosure tubular support members and extend substantially the entire length of said cooking enclosure to support the same for sliding movement thereon.

6. A cooking apparatus comprising:
   a base supporting plate for attaching said apparatus to a recreational vehicle,
   a vertically extending support member secured on said supporting plate,
   said vertically extending support member being a hollow tubular member having one end attached to said supporting plate and its other end open,
   a pivot member comprising a smaller tubular member having one end extending downward into said open end of hollow tubular support member,
   a bracket secured on the other end of said pivot member,
   said smaller tubular pivot member removably received within said open end of said hollow tubular member with sufficient clearance to permit rotary motion therebetween,
   a pair of horizontally extending parallel support members attached to said bracket,
   a box shaped cooking enclosure having a bottom, front and back side walls, end side walls, and a top lid member, and
   one of said end side walls having openings therein and tubular sleeves secured therein to slidably receive said horizontally extending parallel support members for removably supporting said cooking enclosure on said parallel support members.

7. The apparatus according to claim 6 wherein said horizontally extending parallel support members, said openings, and said sleeves are tubular.

8. The apparatus according to claim 7 in which said horizontally extending parallel support members extend for substantially the entire length of said cooking enclosure.

* * * * *